United States Patent [19]
Maginness et al.
[11] Patent Number: 4,870,257
[45] Date of Patent: Sep. 26, 1989

[54] METHOD AND APPARATUS FOR PACKAGING PROCESSED FILM

[75] Inventors: Maxwell G. Maginness, Redmond; Patrick M. Volk, Kirkland, both of Wash.

[73] Assignee: Ciba-Geigy Corporation, Ardsley, N.Y.

[21] Appl. No.: 159,756

[22] Filed: Feb. 24, 1988

[51] Int. Cl.[4] ...................... G06F 15/20
[52] U.S. Cl. ...................... 235/375; 235/487
[58] Field of Search ...................... 235/375, 48 T; 53/55, 53/59

[56] References Cited

U.S. PATENT DOCUMENTS 3,857,220 12/1974 Schneider .................... 235/375 UX

FOREIGN PATENT DOCUMENTS 0024342 4/1981 European Pat. Off. .
0225991 6/1987 European Pat. Off. .

*Primary Examiner*—Harold I. Pitts
*Attorney, Agent, or Firm*—Christensen, O'Connor, Johnson & Kindness

[57] ABSTRACT

A method and apparatus (30) for packaging processed film in a photographic print-processing system. The method includes the steps of reading a dealer identifier from the customer envelope (10) and, after processing, determining the number of photographic prints in the order, determining the number of wallets (43) needed to hold the prints, retrieving the correct number of wallets having a predetermined imprint thereon as determined by the dealer code, and packaging the prints in the wallets. The wallets may be retrieved from a wallet storage (44) that contains wallets having different imprints thereon or can be selected as blank wallets on which the desired imprint is printed after retrieval and before the photographic prints are packaged therein.

9 Claims, 2 Drawing Sheets

METHOD AND APPARATUS FOR PACKAGING PROCESSED FILM

TECHNICAL FIELD

This invention relates to a method and apparatus for packaging processed film, and, more specifically, to a method and apparatus for matching processed prints from any order with a sufficient number of wallets having dealer-selected information printed on the wallets prior to packaging.

BACKGROUND OF THE INVENTION

In a typical commercial film-processing operation for the development of photographic film received from amateur photographers, the orders are initially deposited by the individual customers at commercial locations designated as dealers, such as drug stores, supermarkets, or photographic equipment stores, and then shipped to the central processing laboratory where the undeveloped films are developed and prints made from the developed negatives. Typically, the undeveloped film is delivered to the processing laboratory in an envelope that contains information as to the identity of the individual customer as well as the identity of the dealer who sent it to the processing laboratory. After the film is separated from the envelope and developed, the film and the corresponding prints are placed in the original package and returned to the dealer for eventual pickup by the individual customer.

For reasons of efficiency, the film from a number of customers is processed in a single batch and, though the film and the envelopes are separated during the processing operation, they are maintained in their original batch sequence so that at the end of the developing process the prints can be correlated with the matching envelopes. In order to protect the developed materials, the prints and negatives are first placed in a wallet prior to being put in the original customer envelope.

Rather than using a generic form of wallet, most dealers desire personalization of the wallets to include identification of the dealer or other graphic or textual material by the dealer. This means that it is necessary that the wallets be correctly matched with the customer's negatives and prints as well as the order being matched to the envelope. In order to accomplish this task, machine-readable codes are employed on the envelope so that, as the undeveloped film is removed from the envelope, it can be coded and tracked through the developing process. The code also can be used to identify the dealer from which the order originated. According to one method, the machine code is initially read from the envelope by the developing laboratory as the film is first removed from the envelope. A custom wallet corresponding to the dealer identified by the code is then selected for the order and held with the order envelopes during the developing process. When the prints are finished, they are placed in the waiting preselected wallet along with the developed negatives. This method has a number of disadvantages.

First, it is not easily determinable at the beginning of processing how many finished prints will be contained in a given order. Consequently, after processing, when a customer order is found to contain a large quantity of prints, extra wallets will be required. Because the above-described method preselects the wallets before processing, the packaging process will have to be stopped and an extra wallet obtained or a generic wallet feeder will need to be used to accommodate the extra prints. Shutting down and restarting the assembly line take valuable time and detract from the production output rate of the lab, thus severely affecting profitability of the lab and causing customer dissatisfaction due to late delivery of orders. Also the use of generic wallets defeats the purpose of the method, since it does not contain the dealer-selected imprint. A further disadvantage is that any wallets that are damaged or found to be defective cannot be easily replaced without productivity loss. Another disadvantage of preselecting the wallet prior to production of the prints is that the wallet cannot be partially printed on demand because it is unknown exactly how many wallets will be needed unless prior estimates are made based on film length and order type. This method does not provide for easy custom selection of the graphics or text to be printed on the wallet during the packaging process, thus limiting the dealer's options.

SUMMARY OF THE INVENTION

The present invention overcomes the foregoing and other disadvantages by providing a method and apparatus for packaging processed film in the photographic processing system for handling customer orders having exposed photographic film, an envelope with a machine-readable dealer and customer identifier on it, and photographic prints made from the film. The method of packaging the processed film comprises the following steps: (1) after processing, determining the number of photographic prints in the order; (2) determining from the envelope dealer identifier the desired wallet to be used in packaging the order; (3) determining the number of wallets needed to hold the photographic prints; and (4) retrieving the required number of wallets having the desired imprint; and, (5) packaging the photographic prints in the retrieved wallets.

The selection of wallets having the desired imprint can be made from a store of preprinted wallets having different imprints on them. An alternative would comprise the further step of creating a dealer-specific imprint on the predetermined number of wallets through the use of a printer at the packaging station immediately prior to packaging the photographic prints in the wallets.

The invention also contemplates an apparatus for packaging the photographic customer orders, the orders having exposed photographic film delivered to the processor together with an envelope preprinted with a machine-readable dealer identifier and prints made from the film. The apparatus includes an envelope reader means for reading the dealer identifier from the envelope and producing a wallet identification signal. A photographic print-determining means determines the number of photographic prints in the customer order and a wallet-determining means provides a wallet quantity signal representative of the number of wallets needed to hold the predetermined number of photographic prints. The apparatus further includes a retrieving means responsive to the wallet identification signal and the wallet quantity signal for retrieving the predetermined number of identified wallets from a store of wallets. Finally, a packaging means is provided for packaging the photographic prints in the retrieved wallets.

In accordance with still yet another aspect of the apparatus, a printing means responsive to the wallet-identifying signal is provided at a packaging station for creating a dealer-selected imprint on the predetermined number of wallets prior to packaging the photographic prints into the wallets. The printing means can be used to add additional information to an already partially printed wallet or to create a completely customized version on plain stock.

As will be readily appreciated from the foregoing, the present invention provides a method and apparatus that permit custom selection or custom printing of the wallet after processing and prior to packaging the developed negatives and prints in the wallet. This permits accommodation of arbitrarily large quantities of prints in a single order without halting the packaging process or having to use a generic wallet to hold the extra prints. Having the ability to partially or wholly print the wallets on demand gives the dealer greater flexibility in determining the imprint that it desires on the wallets.

BRIEF DESCRIPTION OF THE DRAWINGS

The foregoing and other advantages and features of the present invention will be better understood from the following description of the preferred embodiment of the invention when taken in conjunction with the following drawings, wherein.

DETAILED DESCRIPTION OF THE PREFERRED EMBODIMENT

Figure 1:
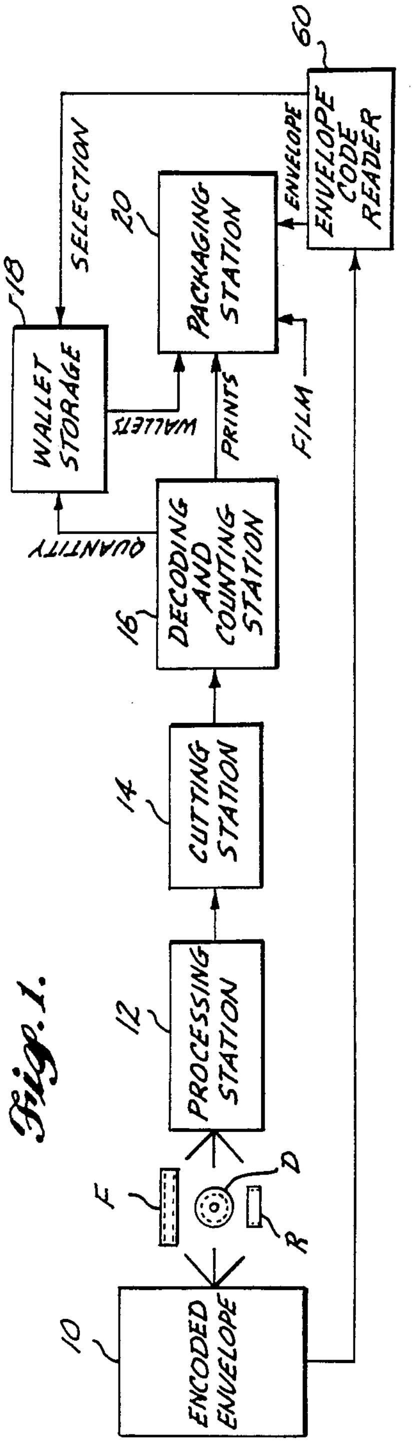
FIG. 1 is a block diagram of one embodiment of a system for packaging processed film made in accordance with the principles of the present invention.

FIG. 1 illustrates the stages of a film-processing operation utilizing the method of the present invention. Incoming photographic orders are received at the processing laboratory in an encoded envelope 10 from a dealer at a commercial location that has initially received the order from an individual customer. The encoded envelope 10 generally bears the name and address of the customer from whom the order is initially received and a coded identification marking corresponding to that marking held by the customer. In addition, a machine-readable dealer identifier code is placed on the envelope 10 to enable tracking of the order as it is processed. The order will typically consist of a roll R of undeveloped photographic film or perhaps a film disk D or film negatives F with instructions to produce photographic prints therefrom. Typically, the film (F, D, or R) is separated from the envelope 10 and is then ready for processing, while the envelope 10 is started on its path through the film lab to an eventual reunion with the film after processing. At this point the machine-readable code is read from the envelope 10 and an identification code of one form or another may be provided on the envelope 10 and the film so that the envelope 10 and/or the film can be matched together after processing. Conventional methods such as photographic reproduction on the film or a splicing tape or label, may be used to place the code on the envelope 10 and/or the film. The identifier can also be preprinted or printed on demand on coded splice tapes or labels.

After the film is provided with the machine-readable identifying code, the film moves to a developing, printing, and processing station 12 where the undeveloped film is developed and photographic prints are made from the developed film. In the case of reprint orders, the negatives obtained from the customer are already developed and it is simply necessary to produce the photographic prints from the already developed negatives in the quantities requested by the customer. Typically, the prints are produced on a long strip of print paper that is wound into a roll. The individual prints are separated by cutting them from the strip at the cutting station 14.

As the photographic prints are produced at the station 12, it is desirable to also provide the prints with a machine-readable identifying code matching the one already present on the film, and the envelope 10, to provide a potential three-way matching of the print, film, and envelope 10 prior to return to the customer, to further enhance the probability that the correct order will reach the customer. Decoding of the prints takes place during cutting at station 16. At this point, the prints may be checked to verify correlation with the film and the envelope 10. In this regard, applicant incorporates herein by reference its application for a Photographic Order Matching Method and Apparatus, Ser. No. 06/888,355, filed on July 23, 1986, as one method for monitoring and evaluating matching errors during processing of the film.

As the prints are counted at the station 16, the number of wallets required to hold the number of photographic prints is determined. According to the present invention, the wallets are stored in an automatic dispenser near the photofinishing area. In one embodiment of the invention wallets preprinted with dealer-selected imprints are stored in separate bins, and when the correct number of wallets needed for an order is determined, as well as the identity of the dealer determined by reading the envelope dealer identifier at station 60, the necessary quantity of wallets having the desired imprint required by the particular dealer identified is automatically dispensed from the storage area 18 and conveyed to the packaging station 20. Here, the identifying codes on the prints, film, and envelope are checked for proper match, and then the prints and film are packaged inside the wallet(s).

Finally, the wallets may be inspected one more time to verify that a proper match has been made prior to placing the packaged wallet inside the encoded envelope 10. After this is accomplished, the packaged order is then priced and returned to the customer.

Figure 2:
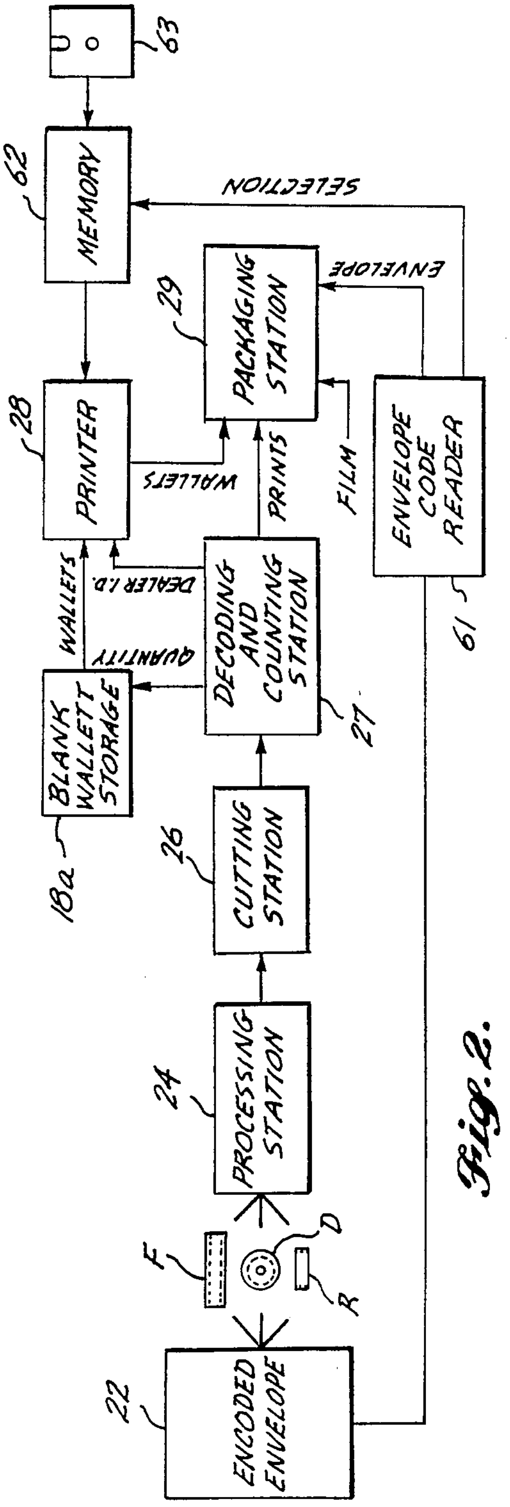
FIG. 2 is a block diagram of an alternative system for packaging processed film made in accordance with the principles of the present invention.

FIG. 2 illustrates an alternative method wherein the encoded envelope 22 is unpackaged and the film (F, D, or R) is sent through the developing station 24, the cutting station 26, and counted at station 27 as heretofore described.

The number of wallets required to hold the quantity of prints in the order is next determined. At this point, in accordance with an alternative method of the present invention, the wallets that are retrieved from the wallet storage 18a have no printing thereon or have some generic imprint and/or colored areas on some portion of the wallet. The retrieved wallets are sent to a printer 28 where a dealer-selected imprint stored in a memory means 62 is printed on the blank wallets, or added to the generic imprint, as the case may be, in accordance with the dealer identity discerned from the envelope code in station 61. The freshly printed wallets are then transferred from the printer 28 to the packaging station 29 where order matching and packaging takes place as previously described. The custom printing of the wallets immediately prior to packaging gives the dealer the choice of several designs stored in a graphic/text file in the printer memory 42, and ensures that the correct number of wallets will be ready to receive the photographic prints without delay. The files 62 can be readily changed or extended by data entered through a magnetic disk 63 or other electronic media prepared by the photoprocessor or provided by the dealer as desired to suit their requirements.

Figure 3:
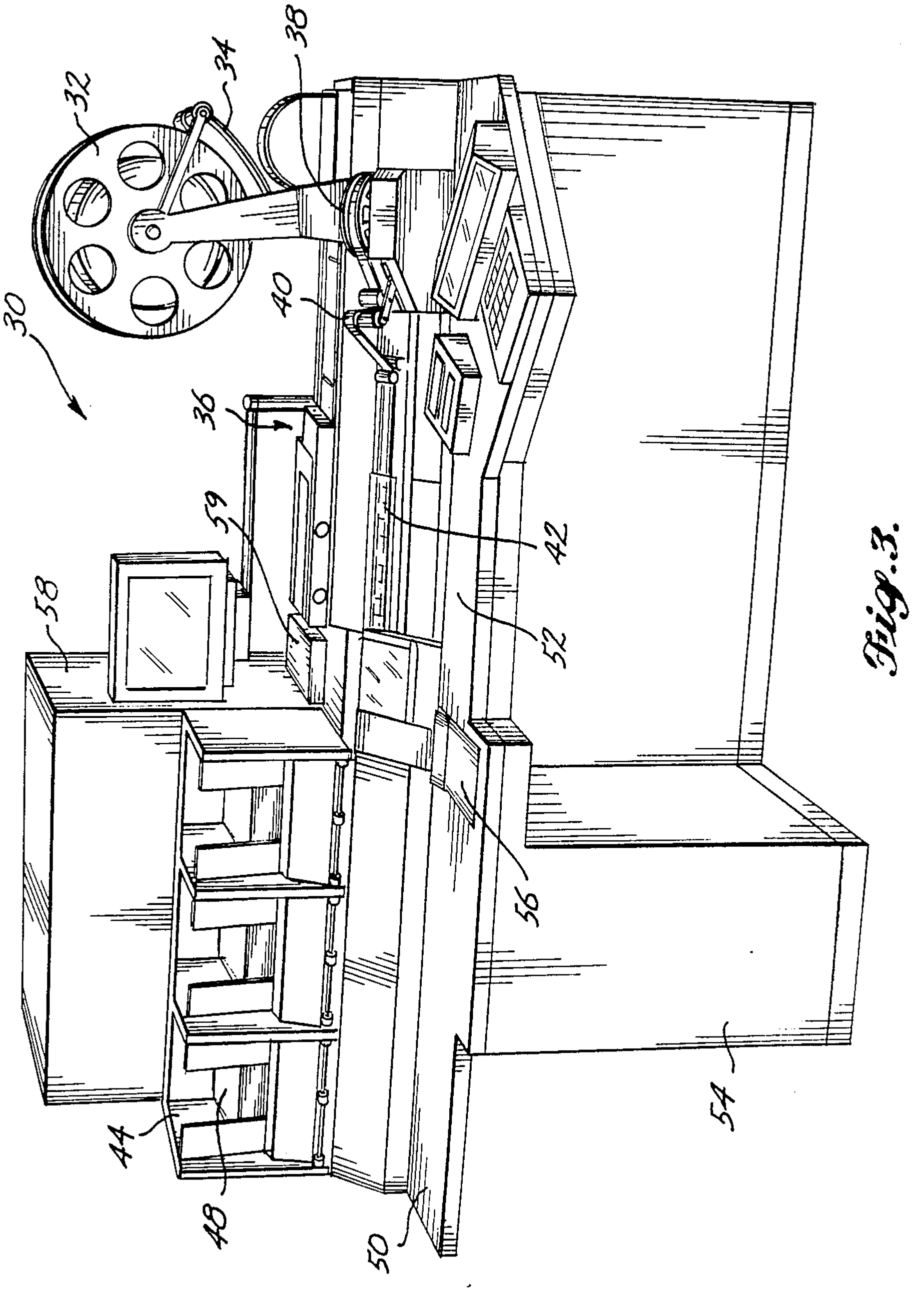
FIG. 3 is an isometric view of one embodiment of a finishing station for packaging developed negatives and prints embodying the system of FIG. 1.

FIG. 3 illustrates a photofinishing station 30 for carrying out the above-described method of packaging processed film. The photofinishing station 30 includes a reel 32 about which are wound several batches of photographic prints in a continuous strip 34. The prints are shown being conveyed to a cutting station 36 where they are separated and cut to proper size. A roll 38 of developed film 40 is shown below the reel 32. The developed film 40 is conveyed to a film cutter 42 for cutting the developed film 40 into strips of a size that permits packaging in wallet 43. At the other end of the photofinishing station 30 are a plurality of storage bins 44 in which are stored stacks 46 of wallets preprinted with dealer-selected indicia 48. The wallets are fed from the stacks 46 on demand to a conveyor tray 50 and conveyed to a packaging area 52. Located near the packaging area 52 is a storage area 54 containing the previously received customer envelopes 56.

In operation, the strip of photographic prints 34 is unreeled from the reel 32 and conveyed to the cutter 36 where it is cut into separate prints. At this point the individual prints are counted. The prints are temporarily held by a robot device 59. Simultaneously, the strip of developed film 40 is cut into the proper lengths and temporarily held in a stacking and insertion mechanism 53.

When the quantity of photographic prints in the order has been determined and the identity of the dealer is determined from the envelope code, read during retrieval from area 54, the correct number of wallets 43 is retrieved from the proper storage bin 44 and conveyed to a loading area 52. At or prior to this time, the encoded customer envelope 56 is presented to the loading area 52. After correct matching of the prints, the film, the wallet, and the envelope is confirmed, the prints and film are automatically placed in the wallet by devices 59 and 53. The loaded wallet is then placed inside the customer envelope 56. When the number of prints requires several wallets, cutting of the prints is suspended when the quantity of prints for the first wallet is reached. The first wallet 43 is loaded with prints and film as described and ejected, while a second wallet corresponding to the same dealer is fed to loading area 52. Print cutting is resumed and the second wallet is loaded with prints only and ejected. This process may be repeated as often as necessary for the number of prints per order and the capacity of the wallets.

As discussed earlier, an alternative method of providing customized wallets is to use blank wallets that are fed to a printer that contains a store of graphic and text options that can be printed on the wallets in response to a control signal based on the identity of the dealer as read from the envelope. An optional printer associated with the photofinishing station 30 for printing customer-selected graphic imprint on the wallets would be generally located as in area 58 adjacent the wallet storage bin 44 and the loading area 52. The exact configuration of the printer does not form a part of this invention and any suitable printer could be used.

While a preferred form of the invention has been described and illustrated herein, it will be understood by those of ordinary skill in the art and others that changes can be made to the illustrated and described embodiment while remaining within the scope of the present invention. For instance, the photographic film may be encoded with a machine-readable code that does not correspond to the customer identifier on the envelope, in which case the code would be encoded on the envelope as well as the prints and the developed film. It may be desirable to further encode the wallets with machine-readable code and check this against the envelope dealer number to ensure correct loading of bins 44. Since changes can be made in the implementation of the invention, the invention is to be defined solely with reference to the claims that follow.

The embodiments of the invention in which an exclusive property or privilege is claimed are defined as follows:

1. In a photographic print processing system for handling customer orders consisting of exposed photographic film, an envelope having a machine-readable dealer identifier on it in which the film is delivered to the processor, and photographic prints made from the film, a method of packaging the processed customer order, comprising the steps of:

(a) after processing, determining the number of photographic prints in the order;

(b) determining the number of wallets needed to hold the encoded photographic prints;

(c) determining the identity of the dealer providing the order;

(d) retrieving the predetermined number of wallets of a type corresponding to the identified dealer from a store of wallets; and (e) packaging the photographic prints into the retrieved wallets.

2. The method of claim 1, further including the step of creating a dealer-selected imprint on the predetermined number of wallets prior to packaging the photographic prints in the wallets.

3. The method of claim 2, further including the step of creating the desired imprint on the predetermined number of wallets after processing and prior to packaging the photographic prints into the predetermined number of wallets.

4. The method of claim 1, wherein said desired imprint is preprinted on said retrieved wallets prior to placement in the store of wallets.

5. The method of claim 3, further including the step of receiving data corresponding to the desired imprint from the dealer in an electronic storage medium to control the step of creating the imprint on the wallets.

6. An apparatus for handling customer orders of photographic prints, including a film delivered to the processor in an envelope preprinted with a machine-readable dealer identifier and prints made from the film, the apparatus comprising:

(a) envelope reader means for reading the machine-readable dealer identifier from the envelope and producing a wallet identification signal representative of said dealer;

(b) photographic print-determining means for determining the number of photographic prints in the customer order;

(c) wallet-determining means for determining the number of wallets needed to hold the photographic prints and for producing a wallet number signal representative of the number of wallets needed;

(d) retrieving means for retrieving wallets having a particular imprint thereon from a store of wallets in response to said wallet identification and wallet number signals.

7. The apparatus of claim 6, further comprising:

printing means for receiving the wallets from said store of wallets and imprinting said particular imprint on the retrieved wallets in response to said wallet identification signal.

8. The apparatus of claim 6, further comprising:

a plurality of storage bins each containing wallets having different imprints thereon, said retrieval means selecting wallets bearing the particular imprint from the bin containing said wallets in response to said wallet identification signal.

9. The apparatus of claim 7, further comprising:

memory means associated with said printing means containing data representing the desired imprint to be printed on the wallets; and input means connected to said memory means for inputting data representing said desired imprint into said memory means.

* * * * *